United States Patent [19]

Tokuno et al.

[11] 4,392,910
[45] Jul. 12, 1983

[54] WEB ALIGNING PROCESS AND APPARATUS

[75] Inventors: Masateru Tokuno, Nishinomiya; Yoshinori Ishii, Yao; Hidetoshi Hoshiyama, Ibaragi, all of Japan

[73] Assignee: Rengo Co., Ltd., Osaka, Japan

[21] Appl. No.: 304,340

[22] Filed: Sep. 21, 1981

[30] Foreign Application Priority Data

Oct. 2, 1980 [JP] Japan .................................. 55-138517

[51] Int. Cl.³ ............................................. B65H 25/26
[52] U.S. Cl. .................................... 156/361; 156/470; 226/15; 226/20; 242/57.1
[58] Field of Search ................. 156/64, 378, 361, 350; 242/57.1; 226/15, 19, 20

[56] References Cited

U.S. PATENT DOCUMENTS

| | | | |
|---|---|---|---|
| 2,941,572 | 6/1960 | Deusen et al. | 242/57.1 X |
| 2,990,173 | 6/1961 | Melville | 242/57.1 X |
| 3,577,299 | 5/1971 | Klein et al. | 156/361 |
| 4,021,031 | 5/1977 | Meihofer et al. | 242/57.1 X |
| 4,054,250 | 10/1977 | Henderson et al. | 242/57.1 |

Primary Examiner—David A. Simmons
Attorney, Agent, or Firm—Wenderoth, Lind & Ponack

[57] ABSTRACT

An apparatus is disclosed for aligning at least two running webs with each other. It is characterized in that any lateral displacement is corrected at a position at a predetermined distance upstream of the displacement detection point or where excessive tension is not applied to the web to be corrected. Further, correction is made taking into consideration the time for the displacement detectors to follow the web movement and the time for the web to come back to a stable condition after splicing.

5 Claims, 5 Drawing Figures

WEB ALIGNING PROCESS AND APPARATUS

BACKGROUND OF THE INVENTION

The present invention relates to an apparatus for aligning with each other the webs to be glued together while they are running for the production of corrugated fiberboards.

In a corrugating machine for producing corrugated fiberboards, a medium liner from a mill roll stand is fed to a single facer where it is corrugated, and a linerboard from another mill roll stand is glued to one side of the corrugated liner to produce a single faced corrugated fiberboard, which is fed with another linerboard to a double facer where the latter is glued to the other side of the single faced corrugated fiberboard to produce a double faced corrugated fiberboard. Also, in order to produce a double wall corrugated fiberboard, two single faced corrugated fiberboards and a linerboard are glued together.

The double faced or double wall corrugated fiberboard thus formed is trimmed to remove any excess selvage portions to produce final products. In the production of these fiberboards, automatic aligning of the two or more webs to be glued together with one another is very important to minimize the production of defective articles and to save labor.

Conventional web alignment devices are provided at a position close to the web gluing station, e.g. somewhere between a preheater and the double facer. Since at such a position a considerably large tension is applied to the webs by a tension unit to keep them from running out of true, correction of displacement at such a position frequently causes breakage of the webs.

Another shortcoming of conventional web alignment devices is that the time required for a web displacement detector to follow a lateral displacement of the web is not taken into consideration. The following-up time required is particularly large after splicing or after a change of the web width. After splicing, the web is liable to run out of true and takes a considerable time to come back to a stable running condition. Such a fact was not taken into account.

SUMMARY OF THE INVENTION

An object of the present invention is to provide an apparatus for aligning at least two running webs which obviate such shortcomings.

The present invention consists in apparatus for aligning with each other at least two running webs to be glued together in the production of corrugated fiberboards wherein any lateral displacement of one web in relation to the other web is detected and in response to a detection signal such displacement is automatically corrected at a position at a predetermined distance upstream of the detection point and where tension applied to the web to be corrected is not excessive, at a timing controlled while taking into consideration the time taken for the displacement detector to follow the lateral movement of the web and the time for the web to come back to a stable running condition after splicing.

BRIEF DESCRIPTION OF THE DRAWINGS

Other objects, features and advantages of the present invention will be apparent from the following detailed description, taken with the accompanying drawings, wherein.

DETAILED DESCRIPTION OF THE INVENTION

Figure 1:
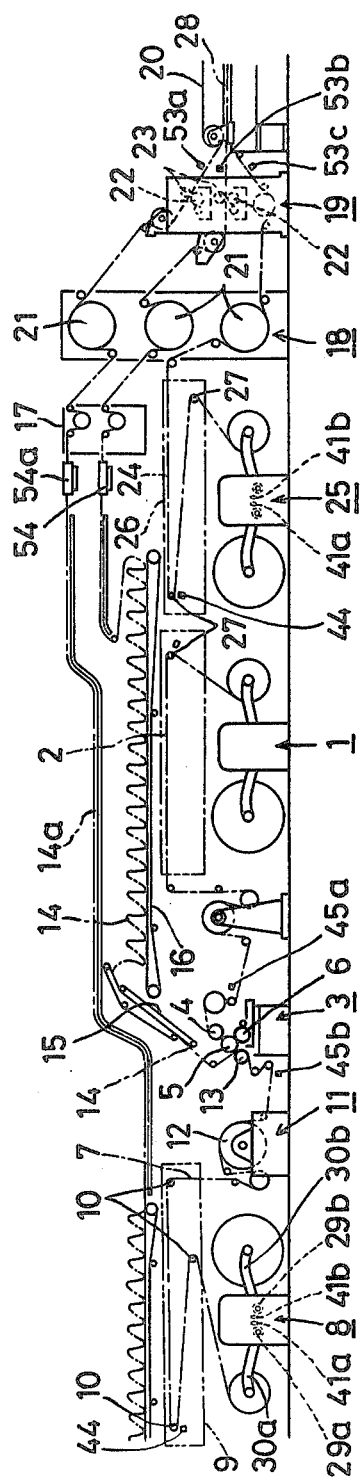
FIG. 1 is a schematic elevation view of an apparatus in accordance with the present invention.

Referring to FIG. 1, a first mill roll stand 1 supplies a medium liner 2 to a single facer 3 where it is corrugated when passed between an upper corrugating roll 4 and a lower corrugating roll 5 and is applied with glue on the crests of the corrugations formed when passed between the lower roll 5 and a glue roll 6.

On the other hand, a coil of a linerboard 7 is mounted on a second mill roll stand 8 provided upstream of the single facer 3. The linerboard 7 runs round a plurality of rolls 10 in a splicer 9 to a preheater 11 where it is fed round a heater drum 12 to preheat it to a desired temperature. The preheated linerboard 7 is then fed to the single facer 3 where, when passed between the lower roll 5 and a press roll 13, it is glued to the corrugated medium liner 2 to produce a single faced corrugated fiberboard 14. It is fed by a vertical conveyor 15 to a low-speed belt conveyor 16 which serves as an accumulator. The fiberboard 14 is then given a suitable tension by a tension unit 17 and is preheated to a desired temperature when running round a heater drum 21 in a preheater 18. The preheated fiberboard 14 is applied with glue on the crests of the corrugations when passing between a glue roll 22 and a rider roll 23 in a gluer 19.

Another web of a single faced corrugated fiberboard 14a, which is similarly produced by the same arrangements (not shown) as those for the fiberboard 14, is similarly pretensioned, preheated, applied glue and fed into a double facer 20 together with the fiberboard 14.

Another linerboard 24 in a coil is mounted on a third mill roll stand 25 arranged upstream of the preheater 18. The linerboard 24 passes round rolls 27 in a splicer 26 and is fed through the preheater 18 and the gluer 19 to the double facer 20 where two single faced corrugated fiberboards 14, 14a and the linerboard 24 are glued together to produce a double wall corrugated fiberboard 28.

Also, to produce a double faced corrugated fiberboard, the linerboard 24 is glued to one of the single faced corrugated fiberboards.

A preferred embodiment of the present invention will be described with reference to FIGS. 2 to 5.

Figure 2:
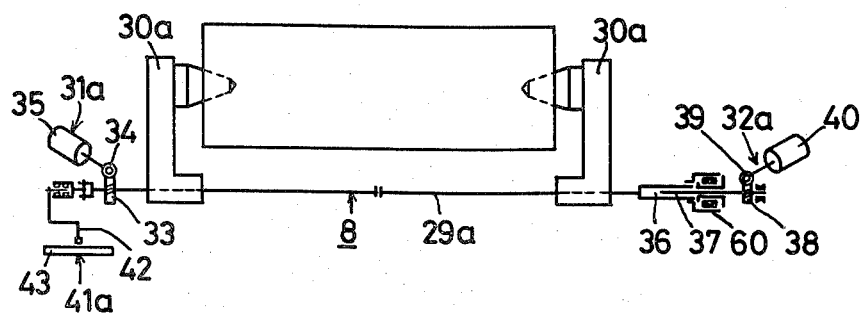
FIGS. 2, 3 and 5 are schematic views of portions of the apparatus.
Figure 3:
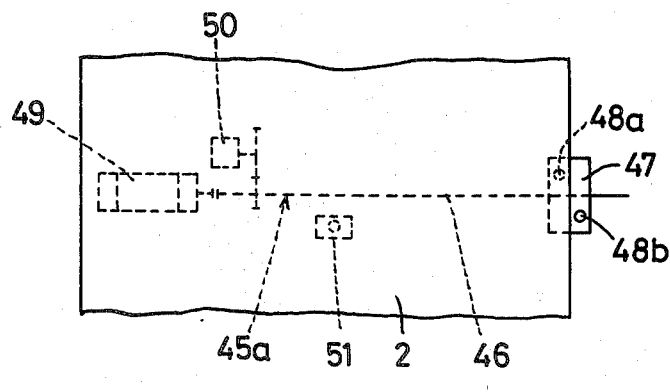
Figure 5:
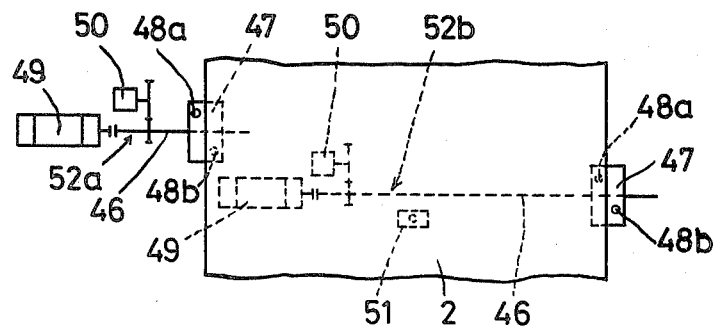

In the preferred embodiment, adjustment of the web position is made at the mill roll stands 8 and/or 25. Both of them as well as the mill roll stand 1 are adapted to support two rolls of web which are to be used one after another. The stands 8, 25 are of the same type and have a pair of roll supports each with a web position controller as illustrated in FIG. 2. Therefore, only one roll support of the mill roll stand 8 will be explained below.

Referring now to FIG. 2, the roll support has a threaded shaft 29a and a pair of support arms 30a threadedly mounted on the threaded shaft. The latter has one half threaded in one direction and the other half threaded in a reverse direction. Therefore, when the shaft is rotated by a shaft turning unit 31a, the opposed pair of support arms 30a move toward or away from each other to mount or remove a roll of linerboard 7.

The threaded shaft 29a is also axially moved by means of a first shaft moving unit 32a. With this axial movement of the threaded shaft, the support arms 30a are moved in the same direction so that the position of the running linerboard web 7 unrolling from the mill roll stand 8 will be adjusted. The support arms 30a are prevented from turning around the threaded shaft 29a when the latter is turned.

The shaft turning unit 31a includes a worm wheel 33 fixedly mounted on one end of the threaded shaft 29a, a worm gear 34 engaging the worm wheel 33, and a motor 35 for driving the worm gear and thus the threaded shaft 29a.

The shaft moving unit 32a includes a coupling member 60 having a female threaded hole and mounted through bearings on the other end of the threaded shaft 29a formed with an axially extending blank hole 36, a threaded driving rod 37 engaging the female threaded hole in the member 60, a worm wheel 38 mounted on the end of the driving rod, a worm gear 39 engaging the worm wheel, and a motor 40 for driving the worm gear 39 and thus the driving rod 37. The rotation of the driving rod causes the coupling member 60 and thus the threaded shaft 29a to move axially to the right or left.

The worm wheel 33 is formed with a key way (not shown) to receive a key (not shown) on the threaded shaft 29a. Therefore, the rotation of the worm wheel 33 is transmitted to the threaded shaft 29a, but the axial movement of the threaded shaft is not transmitted to the worm wheel 33. Merely the key on the threaded shaft slides in the key way in the worm wheel 33.

To detect the axial movement of the threaded shaft 29a, a first moved distance detector 41a is provided which may be a potentiometer or a linear scale. As shown in FIG. 2, it has a movable portion 42 mounted on the threaded shaft 29a so as not to turn therearound and to move over a fixed portion 43 parallel to the threaded shaft 29a as the latter is moved axially. The detector 41a outputs an electrical signal proportional to the distance for which the support arms 30a have moved. It is a mere example and may be replaced with any other suitable means, such as an encoder mounted on the driving rod 37.

Another roll support of the mill roll stand 8 has quite the same arrangements as described above, but its parts are designated with numerals with suffix b, such as 29b, 30b, and 41b.

The mill roll stand in the preferred embodiment may be replaced with any other type stand which can mount two webs in coils which permit movement of the webs.

One of the rolls 10 in the splicer 9 is provided with a run length detector 44 which detects the revolutions per unit time of the roll to give an electrical signal proportional to the length for which the linerboard 7 has run. The run length detector 44 may be an encoder mounted on the shaft of the roll, a sensor (such as a proximity sensor) sensing an iron piece attached to the roll shaft, or a transducer coupled to a measuring wheel rotating in contact with the linerboard 7. The run length detector may be provided at a desired position between a second edge detector 45b described later and the mill roll stand 8.

Downstream of the single facer 3 there is provided a first edge detector 45a for detecting the edge of the medium liner 2. Similarly, upstream of the single facer 3 there is provided a second edge detector 45b for detecting the edge of the linerboard 7. Since these two detectors 45a, 45b are of the same design, only the detector 45a will be described with reference to FIG. 3.

The edge detector 45a includes a threaded shaft 46 extending transversely under the medium liner 2, a supporting plate 47 threadedly engaging the threaded shaft 46 and moving therealong as it rotates, a pair of photocells 48a, 48b mounted on the supporting plate 47 with a slight spacing of e.g. 1.5-2.5 mm in a transverse direction to follow the edge of the medium liner 2, a motor 49 for driving the threaded shaft 46 in response to the signal from the photocells, and an encoder 50 for detecting the revolutions of the threaded shaft 46 and thus the amount of change in the position of the photocells. The first edge detector is adapted to give an electrical signal proportional to the distance between the web edge and a reference position such as the machine center.

If the light of the first photocell 48a is interrupted by the web and that of the second photocell 48b is not, the motor 49 will not be actuated. If the light of both photocells is not interrupted, the motor is driven to rotate the threaded shaft 46 in such a direction as to move the supporting plate 47 and thus the photocells toward the center of the web. If the light of both photocells is interrupted, the motor rotates the threaded shaft in a reverse direction so that the photocells will move away from the center of the web. Under the medium liner 2 substantially at the center thereof, another photocell 51 is provided to detect the presence of the medium liner.

While the linerboard 7 is supplied from a roll supported by the support arms 30a mounted on the threaded shaft 29a, a signal $\alpha$ is given. The signal $\alpha$ is not outputted while it is supplied from a roll supported by the other support arms 30b on the threaded shaft 29b.

Figure 4:
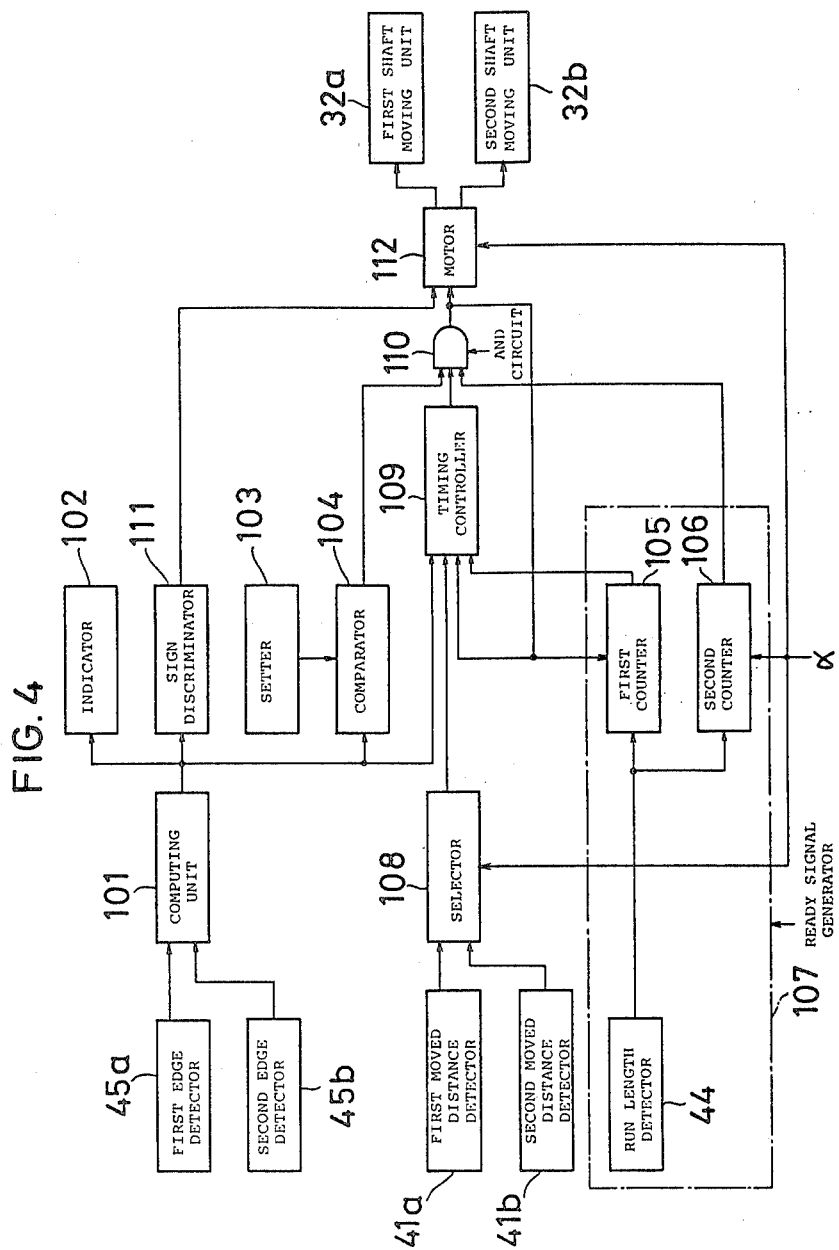
FIG. 4 is a schematic circuit diagram according to the present invention.

With reference to FIG. 4, a control circuit will be described which controls the second mill roll stand 8 to adjust the position of the linerboard 7 from the mill roll stand 8 in relation to the medium liner 2 from the first mill roll stand 1.

The signal from the first edge detector 45a and that from the second edge detector 45b are inputted to a computing unit 101 which determines a difference, if any, between these two signals. The difference signal is indicated on an indicator 102. A comparator 104 compares the difference signal from the computing unit 101 with a signal from a setter 103 for setting an allowable error value and outputs a correction command signal only while it is beyond the allowable error value. Because the corrugated fiberboard produced will have its selvages trimmed in a subsequent process, a slight displacement is allowable. However, the allowable error value may be set to zero.

In response to the fall of a drive signal from an AND circuit 110 which will be described later, a first counter 105 reads a first predetermined value and gives a first READY signal after the signal from the run length detector 44 (pulse signal proportional to the length for which the linerboard has run) has become equal to the first predetermined value.

In response to the rise (or fall) of the signal $\alpha$, a second counter 106 reads a second predetermined value and gives a second READY signal after the signal from the run length detector 44 has become equal to the second predetermined value, and stops giving it at the rise (or fall) of the next signal $\alpha$.

The above-mentioned first predetermined value is a value corresponding to the length for which the linerboard 7 runs from the second mill roll stand 8 to the second edge detector 45b, plus some allowance for the time required for the second edge detector 45b to follow the edge of the linerboard 7. The second predetermined value is a value corresponding to the length for which the linerboard 7 runs from the splicing point at the splicer 9 to the second edge detector 45b, plus some allowance for the time required for the detector 45b to follow the edge of the linerboard and for the time required for the linerboard to come back to a stable running condition after splicing. These two predetermined values are fixed values depending on the characteristics of the second edge detector and of the running condition of the linerboard 7. Generally, the second value is set to be larger than the first value because splicing substantially disturbs the running condition of the linerboard and a considerable time is taken before the linerboard returns to a stable running condition after splicing.

The numeral 107 in FIG. 4 designates a READY signal generator which serves to give a READY signal or signals to start the next cycle of adjustment when the linerboard 7 has run for a sufficient distance after adjustment of the web position at the mill roll stand and after each splicing. The giving of a READY signal means that the system is now ready for the next adjustment. Repeated adjustments of the web position with too short intervals would disturb the web running condition and cause the web to run out of true. The READY signal generator 107 comprises the run length detector 44, the first counter 105 and the second counter 106.

While a selector 108 receives the signal α, it outputs the signal from the first moved distance detector 41a to a timing controller 109. In the absence of the signal α, it outputs the signal from the second moved distance detector 41b. The timing controller 109 gives a timing signal to the AND circuit 110 in response to the first READY signal from the first counter 105 and reads the difference signal from the computing unit 101 upon the rise of the drive signal from the AND circuit 110, and stops outputting of the timing signal when the signal from the selector 108 has become equal to the difference signal from the computing unit 101. The AND circuit 110 outputs the drive signal to a motor 112 only while it receives all of the correction command signal from the comparator 104, the timing signal from the timing controller 109 and the second READY signal from the second counter 106.

A sign discriminator 111 gives e.g. a signal "1" when the difference signal from the computing unit 101 is positive and a signal "0" when it is negative. These signals determine the direction of rotation of the motor or driving unit 112 for driving the first and second shaft moving units 32a and 32b. The motor 112 receives the sign signal from the sign discriminator 111 and the drive signal from the AND circuit 110 and drives the first or second shaft moving unit 32a or 32b in the presence of the signal α or in the absence of it, respectively, to move the linerboard to a correct position in relation to the medium liner.

The manner in which the control circuit according to this invention operates now will be described.

If any difference in the edge position between the linerboard 7 and the medium liner 2 is detected so that the AND circuit 110 outputs a drive signal, the timing controller 109 will read the difference signal from the computing unit 101 at the rise of the drive signal. On the other hand, the motor 112, actuated by the drive signal from the AND circuit, drives the shaft moving unit 32a or 32b, which moves the threaded shaft 29a or 29b axially. The amount of its axial movement is detected by the moved distance detector 41a or 41b and is given through the selector 108 to the timing controller 109. When the signal from the selector becomes equal to the difference signal read in the timing controller 109, the latter stops giving the timing signal so that the AND circuit 110 will stop giving the drive signal. If the correction command signal from the comparator 104 or the second READY signal from the second counter 106 ceases prior to the stop of the timing signal, the AND circuit will cease to give the drive signal.

In response to the fall of the drive signal, the first counter 105 will read the first preset value and simultaneously stop giving the first READY signal. If the signal from the run length detector 44 reaches a value equal to the first preset value, the first counter 105 will re-start to output the first READY signal so that the timing controller 109 will supply a timing signal. When all of the signals, i.e. the timing signal, the correction command signal and the second READY signal, are inputted to the AND circuit 110, the latter will give the drive signal again. Control will continue as described above.

When the linerboard from the support arms 30a is spliced to the one from the support arms 30b, the signal α falls so that the second counter 106 will stop giving the second READY signal and simultaneously reads the second preset value. When the signal from the run length detector 44 becomes equal to the second value, the second READY signal will come again from the second counter 106. In the absence of the second READY signal, the AND circuit 110 will not give the drive signal. Therefore, the shaft moving unit 32a or 32b is not driven. When the second READY signal comes, it will be driven as described before.

In the above-mentioned embodiment, the edges of the linerboard and the medium liner are detected to correct their position. Any other position rather than the edge may be detected. Another embodiment in which the center of the webs are detected to correct their position will be described with reference to FIG. 5.

Under the medium liner 2 there are two edge detectors, one 52a for one edge of the medium liner and the other 52b for its other edge. The signals from these two edge detectors are added together and divided by two to obtain a mean value which is proportional to the distance from a predetermined position to the web center. This is the first center detection value. The second center detection value is determined for the linerboard 7 in the same manner as above. By giving the first and second center detection values to the computing unit 101, the linerboard 7 can be controlled in relation to the medium liner 2 so that their centers will come to the same position.

Although in the above-mentioned control the position of the linerboard 7 has been controlled in relation to the position of the medium liner 2, the latter may be controlled in relation to the former.

The web position control in the production of a single faced corrugated fiberboard has been described above. Next, the web position control in the production of double faced corrugated fiberboard and double wall corrugated fiberboard will be described below.

The third mill roll stand 25 carrying two rolls of linerboards is provided with two moved distance detectors 41a, 41b similar to those of the mill roll stand 8. On one of the rolls 27 in the splicer 26, a run length detector 44 is provided for detecting the length for which the linerboard has run. Upstream of the double facer 20, third, fourth and fifth edge detectors 53a, 53b, 53c are provided to detect the edge of the single faced corrugated fiberboard webs 14 and 14a and the linerboard 24, respectively. These edge detectors are of the same design as the first edge detector 45a.

The web position control in gluing the linerboard 24 to the single faced corrugated fiberboard 14 or 14a to produce a double faced corrugated fiberboard can be done in the same manner as described above.

For web position control in the production of double wall corrugated fiberboard by gluing together two single faced corrugated fiberboards 14, 14a and the linerboard 24, one single faced corrugated fiberboard and the linerboard 24 may be adjusted separately in relation to the other single faced corrugated fiberboard. The linerboard 24 can be adjusted in the same manner as the linerboard 7. The adjustment of the position of the single faced corrugated fiberboard 14 or 14a should be done by controlling a web guide 54 or 54a. The use of the web guide for aligning the webs minimizes the possibility of web breakage because the web guide is provided upstream of the tension unit 17 where the tension applied to the web is relatively low.

The web guide serves to correct any lateral displacement of the web as the mill roll stand illustrated in FIG. 2 does. It may comprise a threaded shaft similar to the shaft 29a, an opposed pair of support arms and guide members such as belts or plates mounted on the support arms and contacting the edge of the web. When the threaded shaft is driven, the support arms are moved toward or away from each other so that the distance between the two guide members will be adjusted to the web width. Also, by moving the threaded shaft and thus the support arms laterally, the lateral position of the web is adjusted.

In the production of double wall corrugated fiberboard, web position control also may be done by comparing the center position of three webs, i.e. two single faced corrugated fiberboards and the linerboard, rather than by comparing their edge positions.

In the present invention, each edge detector should preferably be provided as close as possible to the position where the webs are glued together.

It will be understood from the foregoing that in accordance with the present invention the lateral positions of the webs to be glued together can be automatically adjusted to each other at a position at a sufficient distance from and upstream of the displacement detection point, such position being where the web is unwound from a roll or where the tension applied to the web to be corrected is not so excessive as to cause web breakage. Also, web position is controlled taking into consideration the following of the displacement detectors and a relatively long time taken for the web to come back to a stable condition after splicing.

What we claim:

1. An apparatus for aligning at least two running webs to be glued together with each other in the production of corrugated fiberboard, said apparatus comprising:
    two web position detectors provided adjacent to a gluing station for detecting the lateral positions of the respective webs,
    a computing means for combining the signals from said web position detectors to generate a difference signal proportional to the difference therebetween,
    web moving means disposed at a position at a predetermined distance upstream of the detection point for correcting any lateral displacement of one web in relation to the other,
    a moved distance detector means for generating a signal proportional to the distance for which the web has been moved by said web moving means,
    READY signal generator means for generating a first READY signal from when the web corrected has run at least for said predetermined distance after the last correction of displacement and generating a second READY signal at least from when a spliced point has passed the detection point after splicing of one web to the other web, and
    a timing controller which in the presence of said first READY signal gives a timing signal until the signal from said moved distance detector means becomes equal to said difference signal,
    said web moving means operating while it receives said timing signal and said second READY signal.

2. An apparatus as claimed in claim 1, wherein said position for correction is where the respective web is unwound from a roll.

3. An apparatus as claimed in claim 1, wherein said position for correction is where the tension applied to the web to be corrected is not so excessive as to cause web breakage.

4. An apparatus as claimed in any of claims 1-3, wherein said READY signal generator means comprises a run length detector for generating a signal proportional to the length for which the web has run, a first counter which receives a first preset value after each correction of displacement and gives said first READY signal after said signal from said run length detector has become equal to said first preset value, and a second counter which normally gives said second READY signal and, after each splicing, stops giving it and receives a second preset value and restarts to give said second READY signal after said signal from said run length detector has become equal to said second preset value.

5. An apparatus as claimed in any of claims 1-3, further comprising a comparator means for comparing the signal from said computing means with a reference value and generating a correction command signal only while said signal is larger than said reference value, said web moving means operating while it receives said timing signal, said second READY signal and said correction command signal.

* * * * *